United States Patent [19]

Frank

[11] 4,285,715
[45] Aug. 25, 1981

[54] CYCLE OF MOLD MOVEMENT WHILE PRESS BENDING GLASS SHEETS

[75] Inventor: Robert G. Frank, Murraysville, Pa.

[73] Assignee: PPG Industries, Inc., Pittsburgh, Pa.

[21] Appl. No.: 111,511

[22] Filed: Jan. 11, 1980

Related U.S. Application Data

[63] Continuation-in-part of Ser. No. 954,697, Oct. 25, 1978, Pat. No. 4,187,095, which is a continuation-in-part of Ser. No. 78,626, Sep. 25, 1979, Pat. No. 4,252,552.

[51] Int. Cl.$^3$ .............................................. C03B 23/03
[52] U.S. Cl. ...................................... 65/106; 65/104; 65/107; 65/268; 65/273
[58] Field of Search ................. 65/104, 106, 107, 273, 65/268

[56] References Cited

U.S. PATENT DOCUMENTS

| | | | |
|---|---|---|---|
| 1,889,881 | 12/1932 | Thompson | 65/287 X |
| 3,508,903 | 4/1970 | Seymour | 65/273 |
| 3,607,187 | 11/1971 | McMaster | 65/106 |
| 3,846,104 | 11/1974 | Seymour | 65/104 |
| 4,092,141 | 5/1978 | Frank | 65/104 X |
| 4,187,095 | 2/1980 | Frank | 65/104 |
| 4,197,108 | 4/1980 | Frank et al. | 65/273 |
| 4,202,681 | 5/1980 | McMaster et al. | 65/104 |

*Primary Examiner*—Arthur D. Kellogg
*Attorney, Agent, or Firm*—Donald Carl Lepiane; Edward I. Mates

[57] ABSTRACT

In press bending glass sheets delivered while heat-softened into a shaping station between an upper vacuum mold and a lower lifting mold wherein the glass sheet is first lifted on said lifting mold, transferred by suction to said vacuum mold, lifted while engaged by said vacuum mold to provide clearance for entry of a ring-like member to a position below said vacuum mold, stopping the suction in said vacuum mold to drop said glass sheet onto said ring-like member and removing said glass sheet from said shaping station while supported on said ring-like member, the rate of production is increased by lowering said vacuum mold into a parking position closely adjacent to the uppermost position permitted for said lifting mold to provide clearance for delivering a succeeding glass sheet to said shaping station and reducing the vertical distance needed to lift the glass sheet to a position where it can be transferred by suction to the vacuum mold once the ring-like member clears said shaping station.

19 Claims, 10 Drawing Figures

CYCLE OF MOLD MOVEMENT WHILE PRESS BENDING GLASS SHEETS

RELATION TO OTHER APPLICATIONS

The present application is a continuation-in-part of U.S. patent application Ser. No. 954,697 of Robert G. Frank, filed Oct. 25, 1978, for METHOD AND APPARATUS FOR HANDLING GLASS SHEETS DURING SHAPING AND COOLING now U.S. Pat. No. 4,187,095, and a continuation-in-part of U.S. patent application Ser. No. 78,626 of Robert G. Frank, filed Sept. 25, 1979, for SHAPING GLASS SHEETS USING MOLDS OF DIFFERENT SHAPES now U.S. Pat. No. 4,252,552.

The present application relates to an invention that is closely related to the inventive subject matter disclosed in U.S. patent application Ser. No. 954,693 of Robert G. Frank, filed Oct. 25, 1978 for APPARATUS FOR HANDLING GLASS SHEETS DURING SHAPING AND COOLING now U.S. Pat. No. 4,185,986, U.S. patent application Ser. No. 954,695 of Robert G. Frank, filed Oct. 25, 1978 for VACUUM MOLD WITH UNIFORM RELEASE MEANS now U.S. Pat. No. 4,221,580, U.S. patent application Ser. No. 954,696 of Robert G. Frank, Rudy Canonaco and Richard V. Posney, filed Oct. 25, 1978 for SLOTTED GLASS SHEET SHAPING MOLD now U.S. Pat. No. 4,197,108, U.S. patent application Ser. No. 961,079 of Robert G. Frank, filed Nov. 15, 1978 for GLASS SHEET TEMPERING METHOD AND APPARATUS U.S. Pat. No. 4,225,333 and U.S. patent application Ser. No. 78,627 of Robert G. Frank, Rudy Canonaco and Richard V. Posney, filed Sept. 25, 1979 for SLOTTED GLASS SHEET SHAPING MOLD.

BACKGROUND OF THE INVENTION

1. Field of the Invention

This invention relates to shaping and cooling glass sheets and particularly to the high speed production of bent glass sheets that are toughened by air quenching, and most particularly, for shaping and heat treating relatively thin glass sheets, particularly those having a nominal thickness of $\frac{1}{8}$ inch (3.2 mm) or less. Thinner glass sheets sag more readily than thicker glass sheets at any given elevated temperature above the glass deformation temperature. Hence, it is more difficult to control the shape imparted to thinner glass sheets.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of said path into a shaping station where each glass sheet in turn is transferred onto a lifting mold that lifts the glass sheet into adjacency to a vacuum mold. The vacuum mold lifts and holds the shaped glass by suction. The lifting mold retracts to below the substantially horizontal path. At about the same time, a transfer and tempering ring having an outline shape conforming to that of the glass sheet slightly inboard of its perimeter moves upstream into a position below the vacuum mold and above the lifting mold. Release of the vacuum deposits the shaped glass sheet onto the tempering ring. The tempering ring conveys the glass sheet into a cooling station for rapid cooling.

In prior art apparatus, the vacuum mold was kept elevated at the same raised position it occupied to provide clearance for entry and removal of the tempering ring into and out of the shaping station. Consequently, it was necessary to lift the lifting member a relatively considerable distance above the level of said substantially horizontal path to bring the heat-softened glass sheet sufficiently close to the upper vacuum mold to enable the vacuum mold to complete the transfer of the glass sheet thereto by suction. The time needed for this lifting step over said relatively considerable distance limited the maximum rate of production of shaped glass sheets to less than a desired rate.

2. The Prior Art

U.S. Pat. No. 1,889,881 to Ralph C. Thompson shapes a soft, horizontally disposed glass sheet between an upper mold and a lower mold of complementary shape. A portion of the lower mold within its outline marginal portion is recessed below the surface of the outline marginal portion to avoid simultaneous engagement of the opposite glass sheet surfaces in the vision area of the glass sheet. The soft glass sheet is simultaneously engaged at its opposite surfaces in the marginal portion only and sags within the limits of the recessed lower mold portion inside the marginal portion.

U.S. Pat. No. 3,508,903 to Samuel L. Seymour press bends tong gripped glass sheets between molds having shaping surfaces of slightly different radii of curvature to avoid simultaneous engagement of the viewing area between the molds. Such an arrangement does not avoid tong marks in the bent glass.

U.S. Pat. No. 3,607,187 to Harold A. McMaster lifts a soft, flat glass sheet by lowering a vacuum mold toward said sheet and applying suction through a downwardly facing curved shaping surface of a vacuum mold to shape the sheet by suction thereagainst. Much power is needed to provide the suction necessary to shape the entire flat glass sheet to conform to the curved shape of the vacuum mold in incremental portions, particularly those portions most widely spaced from the vacuum mold when other portions are initially engaged by the vacuum mold.

U.S. Pat. No. 3,846,104 to Samuel L. Seymour provides method and apparatus in which glass sheets are conveyed through a furnace on conveyor means, and heated while passing through the furnace to a temperature approaching the glass softening point. At a shaping station beyond the furnace, each glass sheet in turn is lifted by a lower outline shaping mold which raises the glass sheet into engagement with an upper vacuum mold having a shape conforming to that desired for the glass. The upper vacuum mold remains at the shaping station and holds the shaped glass thereagainst as the lower shaping mold retracts to below the level of the conveyor means. A tempering ring shaped to support the bent glass sheet adjacent its marginal or peripheral edge only, moves generally horizontally between the shaping station and a cooling station to receive each shaped glass sheet released by the vacuum mold and transfer it to the cooling station. The upper vacuum mold remains in an elevated position after it releases the vacuum until such time as the tempering ring leaves the shaping station for the cooling station and a subsequent glass sheet arrives at the shaping station. Therefore, each glass sheet must be lifted to said elevated position for transfer to said vacuum mold, a time consuming step.

U.S. Pat. No. 4,092,141 to Robert G. Frank and DeWitt W. Lampman provides similar apparatus with vertically movable sheet transfer means for rapidly removing from the tempering ring each bent glass sheet after its surfaces harden sufficiently to permit it to be conveyed on an additional downstream conveyor. The latter provides a glass sheet supporting surface at an elevation slightly higher than the level at which the glass sheet is supported by the transfer and tempering ring. However, the apparatus of this prior art patent also provides that the upper vacuum mold remain in an elevated position awaiting the arrival of a subsequent glass sheet at the shaping station.

The prior art patents fail to provide a shaping operation that causes the upper vacuum mold to be vertically movable into a parking position that provides clearance for the glass sheet entering the shaping station, and yet reduces the vertical distance that the glass sheet must be lifted until it is close enough to the upper vacuum mold to permit the glass sheet transfer to be completed by suction.

SUMMARY OF THE INVENTION

The present invention provides shaping apparatus that performs a glass sheet shaping method that helps to produce glass sheets at a more rapid rate of production than the maximum possible with the apparatus operated in the manner taught in the prior art. The shaping apparatus of the present invention is used in combination with a conveyor that delivers glass sheets from a heating furnace into a shaping station along a given path that is usually essentially or approximately horizontal as in a roller hearth conveyor, but which may be tilted transversely as in a gas hearth conveyor.

The present invention is particularly useful to shape and temper thin glass sheets (herein defined as having a thickness less than ⅛ inch or 3.2 millimeters) because it takes advantage of the ready tendency for thin glass sheets to sag by gravity at elevated temperatures needed for imparting a temper in the shaped glass sheets and also takes advantage of the fact that thinner glass sheets are more easily lifted by suction than thicker glass sheets.

The apparatus aspect of the present invention comprises the subcombination of a lower lifting mold defining a shape having a given sharpness of bend, a ring-like member and means to control the positions of said molds and of said ring-like member during a shaping cycle. The control means lowers the upper mold to a parking position sufficiently close to said given conveyor path to enable the upper mold to engage the glass sheet by suction, yet sufficiently separated from said path to let the glass sheet move into position below the upper vacuum mold. Means is provided to increase the space between the molds rapidly by lifting the suction-applying upper vacuum mold and simultaneously lowering the lifting mold to below the path of said conveyor to permit the entry of a ring-like member therebetween. The ring-like member combines with the subcombination of molds to provide a specific embodiment of apparatus and defines a shape that may be the same or different from that of the downwardly facing shaping surface of the upper vacuum shaping mold.

According to a specific embodiment of the present invention, a heat-softened glass sheet at the shaping station is engaged at its lower surface with a lower lifting mold having an upward facing shaping surface defining a bend component having a given sharpness of curvature. The soft glass sheet sags by gravity toward the upward facing shaping surface of the lower lifting mold as the latter rises. The upper vacuum mold is located in a parking position with its downwardly facing shaping surface only a few thickness of the glass sheet above the path defined by the conveyor. Suction is applied to the upper vacuum mold and the lifting mold rises when the glass sheet arrives at the shaping station.

The upper vacuum mold has a downward facing shaping surface of slightly more shallow shape than the upward facing shaping surface of the lower mold to enable the upper vacuum mold to engage a pair of opposite edge portions only of the glass sheet initially, and then to increase its area of engagement as suction continues to change the shape of the heat-softened glass sheet to that of the downwardly facing shaping surface of the upper vacuum mold. If no further process is required for the glass sheet, it may be released from the vacuum mold.

However, glass sheets shaped in the manner described are usually heat-strengthened or tempered to improve their strength and are usually transferred to and supported on a ring-like member adjacent their periphery while the shaped glass sheet is cooled by playing tempering medium (most frequently, blasts of cold air) that chill the opposite surfaces of the shaped glass sheet rapidly enough to establish a stress pattern throughout the glass sheet thickness that characterizes heat-strengthened or tempered glass. When the ultimate shape desired for the glass sheet is that of the downwardly facing shaping surface of the upper vacuum mold, the ring-like member has an upwardly facing outline shaping surface that conforms to that of the downwardly facing shaping surface of the upper vacuum shaping mold.

However, when a given combination of lower lifting mold and upper vacuum mold of slightly different configurations is provided at a glass sheet shaping apparatus and the glass part to be produced requires a shape different from that defined by the downwardly facing shaping surface of the upper vacuum mold, it is possible to produce a wide variety of bends by replacing the ring-like member whose upper shaping surface correlates with the previous production part with one whose upper shaping surface correlates with the next succeeding production part of different configuration.

In a specific embodiment of this invention, the upper vacuum mold is raised as promptly as possible after engaging the upper surface of the glass sheet by suction and the lower lifting mold is simultaneously lowered to enable the ring-like member to enter the space below the upper and lower molds. When the ring-like member arrives at its desired location, the vacuum is discontinued to drop the glass sheet onto the ring-like member and the ring-like member transports the glass sheet as rapidly as possible into the cooling station where the sheet is cooled at a rate depending on the degree of temper desired in the glass. According to this invention, the upper vacuum mold is lowered into its parking position as soon as the ring-like member clears the shaping station en route to the cooling station.

Returning the upper vacuum mold to its parking station to await the arrival of the next glass sheet at the shaping station lessens the time needed to lift the lower lifting mold into close adjacency to the upper vacuum mold. This reduces the time needed for a shaping cycle to be completed, measured from the time of arrival of a glass sheet at the shaping station occupied by the vertically movable upper vacuum mold and the lower lifting mold.

The present invention will be better understood in the light of a description of an illustrative embodiment that follows, which description includes the accompanying drawings wherein like reference numbers refer to like structural elements.

DESCRIPTION OF THE PREFERRED EMBODIMENT

Figure 1:
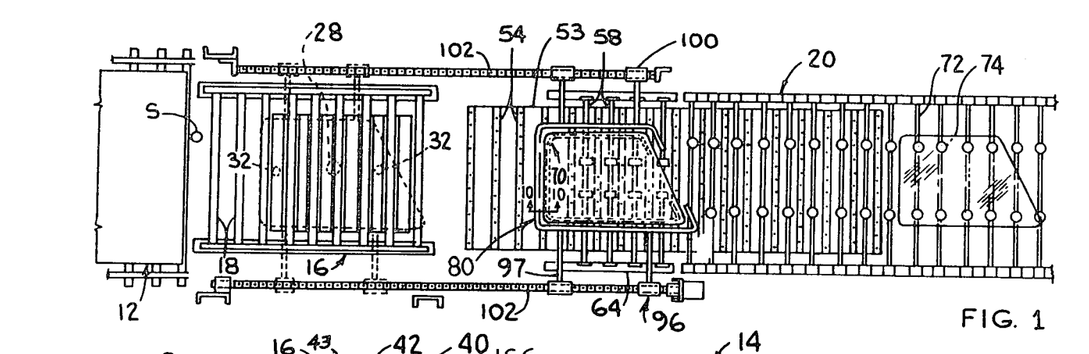
FIG. 1 is a fragmentary, plan view of apparatus for shaping and tempering glass sheets incorporating a preferred embodiment of the present invention, with certain parts omitted for clarity.
Figure 2:
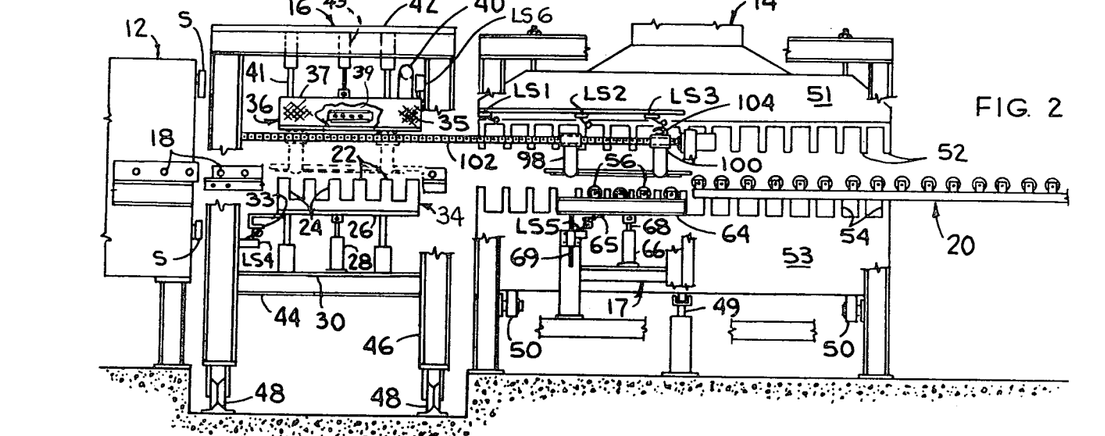
FIG. 2 is a fragmentary, longitudinal view of the embodiment of FIG. 1 with certain parts omitted or broken away or shown in inconsistent positions to show other parts of the apparatus more clearly and with certain positions depicted in phantom consistent with FIG. 1.

Referring now to FIGS. 1 and 2 of the drawings, an apparatus for heating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor 20 for transport to the unloading station.

Heat may be supplied in the furnace 12 by hot gases from gas burners or by electrical radiant heaters or by a combination of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element S is located beyond the exit of furnace 12 to initiate a cycle of operation of this apparatus.

Limit switches LS-1 through LS-6 are provided to synchronize the operation of various elements of the apparatus according to a predetermined sequence. The glass sensing element S, the limit switches LS-1 through LS-6 and various timer circuits actuated thereby cooperate to provide synchronizing means for the apparatus of the present specification.

Figure 4:
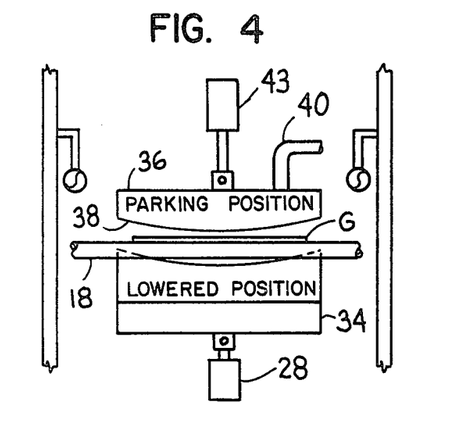
FIG. 4 is a cross-sectional, schematic view taken across the shaping station showing a flat, hot glass sheet entering the shaping station with an upper vacuum mold in its lowered parking position and a lower lifting mold below the level of the path defined by a glass sheet transport conveyor.
Figure 5:
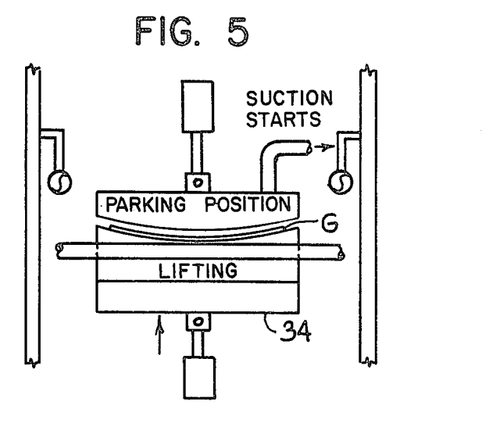
FIG. 5 is a view similar to FIG. 4 taken immediately after FIG. 4, showing how the hot glass sheet is engaged by the upper shaping surface of the lower lifting mold to lift and shape the glass sheet.
Figure 6:
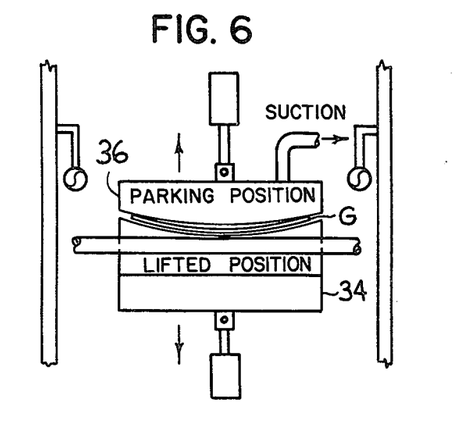
FIG. 6 is a view similar to FIGS. 4 and 5, taken immediately after FIG. 5, showing how the upper vacuum mold initially engages the glass sheet along its opposite edges when the distance between the molds is sufficiently small to enable suction to lift the glass sheet from the lower lifting mold.

The shaping station 16 comprises a lower lifting mold 34 and an upper vacuum mold 36. The latter is composed of metal covered with a refractory material such as fiber glass 35, as is well known in the art. The lifting mold 34 comprises an upper curved surface 22 (FIG. 3) conforming in elevational shape to a first shape desired for a glass sheet to be bent. The upper surface 22 is interrupted intermittently by transversely extending grooves 24 which provide clearance for raising and lowering the lower lifting mold 34 between a lowered position slightly below the conveyor rolls 18, as depicted in FIGS. 2, 3, 4, 8 and 9, and a lifted position slightly above the level of said conveyor rolls, as depicted in FIGS. 5 and 6. The lower lifting mold 34 is fixed to a lower mold support 26 operatively connected for vertical movement to a piston 28, and is limited in its upward movement toward the upper vacuum mold 36 to a closest spacing therebetween slightly greater than the glass sheet thickness, preferably no less than twice the glass sheet thickness, below the parking position of the upper vacuum mold 36.

Since automobile side windows have a fairly constant radius of curvature about a horizontal axis in order to facilitate their raising and lowering in an automobile body between an open and a closed position, many different patterns in a family of patterns have different outline shapes but are bent to the same radius of curvature. Therefore, it is desirable to have one lower lifting mold capable of producing each family of patterns. It has been found that a lower shaping mold of a given radius of curvature, having longer dimensions than a family of side windows of said given radius of curvature but of different outline shapes and/or different dimensions, can fabricate curved side windows of said family of different sizes but of said given radius of curvature. In the apparatus of this specification, one lower lifting mold can be installed in conjunction with an upper vacuum mold of slightly different curvature to produce any pattern of a family of patterns having a given radius of curvature but of different sizes and/or outline shapes without requiring any removal or replacement of the lower lifting mold and/or of the upper vacuum mold.

The upper surface 22 of the lower lifting mold 34 is preferably smoothly surfaced to avoid imparting any irregularity in the supported glass sheet surface, is composed of a material that does not react with glass, that is easily shaped to the smoothly surfaced contour desired and that has good durability despite intermittent contact with hot glass that causes rapid cyclical temperature variations over an extended period. A good material for the grooved lower lifting mold 34 is an alumino-silica cement sold by Johns-Manville under the trademark of TRANSITE.

Raising and lowering means in the form of a piston 28 rigidly mounted to a piston support platform 30 raises and lowers support 26 and its attached lower lifting mold 34 a limited distance. Alighment posts 32 are attached to mold support 26 to assure vertical movement of the lower lifting mold 34. A lug 33 is connected to mold 34 to actuate limit switch LS-4.

The upper vacuum mold 36 has an upper mounting plate 37 and a lower wall 38 that is apertured, as well as side walls 39, at least one of the latter being apertured. The lower wall 38 is shaped to be slightly less sharply bent than the shaping surface formed by the upper surface 22 of the lower lifting mold 34. The upper vacuum mold 36 communicates with a source of vacuum (not shown) through an evacuation pipe 40 and a suitable valve (not shown). The upper vacuum mold 36 is suitably connected through upper vertical guide rods 41 to an upper supporting frame 42 and movable relatively thereto by an upper vertical piston 43. The evacuation pipe 40 may be connected through a suitable valve arrangement to a source of pressurized air (not shown) and the valves for the vacuum line and for the pressure line may be synchronized according to a predetermined time cycle in a manner well known in the art.

Figures 3, 10:
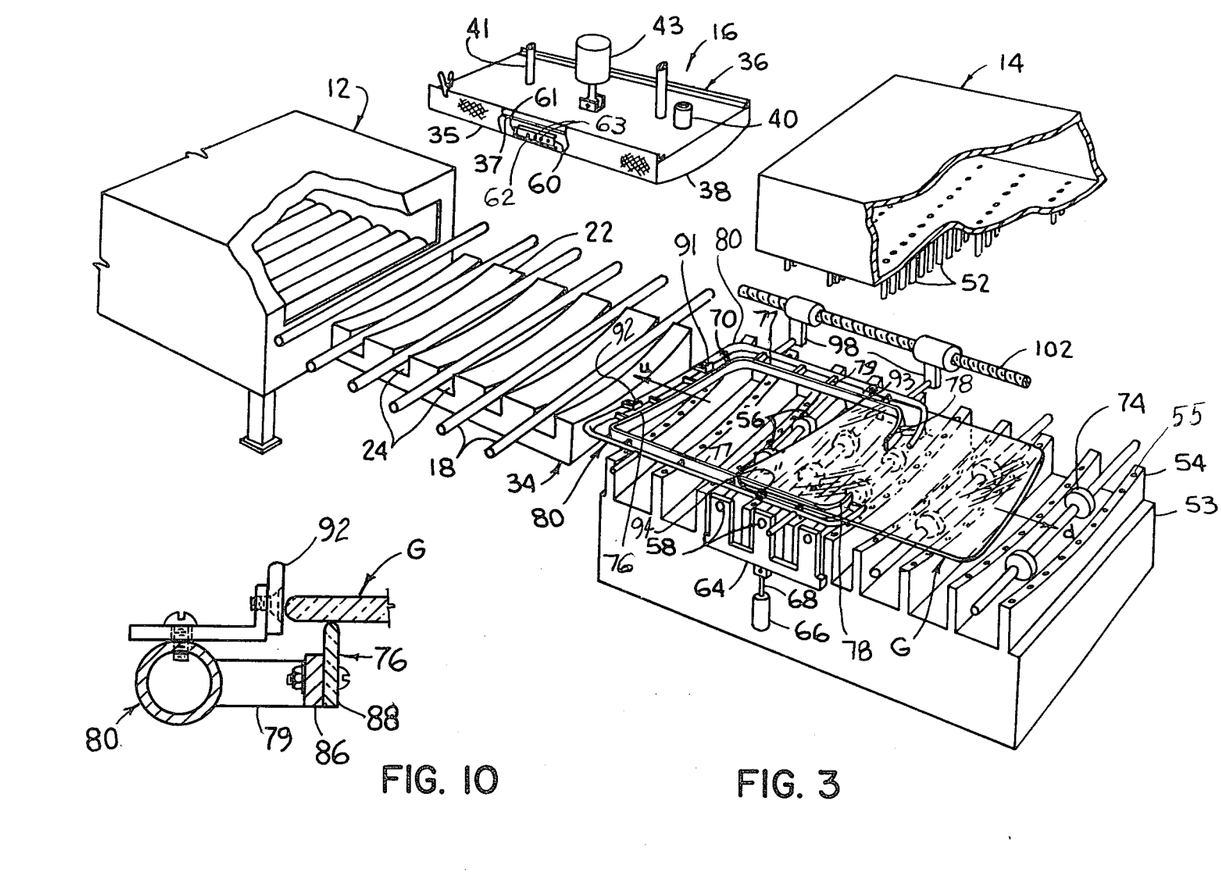
FIG. 3 is a schematic perspective view of a portion of the apparatus of FIGS. 1 and 2 with parts omitted to show a simplified illustration of the structure of a shaping station included in the preferred embodiment.
FIG. 10 is a cross-section view taken along the line 10—10 of FIG. 1, of a ring-like member whose upper shaping surface supports the marginal edge portion of a shaped glass sheet for transfer from the shaping station to a cooling station.

Any portion of a side wall 39 of the upper vacuum shaping mold 36 that contains apertures is also provided with an apertured slide 60 having a tab 61 at one end thereof (see FIG. 3). The slide 60 has its longitudinal side portions engaged by a pair of parallel Z-shaped guides 62. The latter are attached along their length to the side wall 39. The tab 61 can move between the Z-shaped guides 62 when the position of the apertured slide 60 is adjusted relative to the apertured side wall 39. The apertured slide 60 has apertures 63 corresponding in size, shape and space therebetween to the arrangement of the apertures in apertured wall 39.

When the apertured slide 60 occupies a position in which its apertures 63 are completely aligned with the apertures in apertured side wall 39, it provides a maximum effective open area for the side wall 39. When the apertured slide 60 occupies a position in which the apertures 63 face the spaces between the apertures in the side wall 39, side wall 39 has no effective open area. It is understood that the slide 60 may be adjusted in any position in which its apertures 63 are partially aligned with apertures in the side wall 39 or in which only one or more of its apertures 63 are partially or completely aligned with one or more apertures in the side wall to provide a desired amount of effective open area in the side wall 39 and means for adjusting the amount of open area as needed.

The reason for providing apertures in at least one of the side walls 39 and an apertured slide 60 therefor is to insure that a glass sheet G drops uniformly onto a ring-like member 70 without tilting from the orientation at which it is engaged against the apertured lower wall 39 of upper vacuum shaping mold 36 when vacuum is released from the latter. When small apertures are uniformly distributed throughout the apertured lower wall 38 and the glass sheets treated have a uniform outline shape, such as an essentially rectangular or circular outline, air under pressure acts uniformly around the perimeter of the glass sheet to cause the latter to drop without tilting onto the ring-like member 70 when vacuum is released in upper vacuum mold 36. However, when a treated glass sheet has an irregular outline, upon releasing the vacuum, air enters the vacuum chamber of the upper vacuum mold 36 through the small apertures not aligned with the upper surface of the glass sheet in such a manner as to cause a temporary pressure gradient within the upper vacuum mold 36. This pressure gradient produces a non-uniform downward thrust against the upper surface of the glass sheet that was previously supported agninst the apertured lower wall by vacuum. This non-uniform downward thrust causes the released glass sheet to tilt as it drops toward the ring-like member 70. Providing additional apertures having an effective open area that can be adjusted for the upper vacuum mold provides relatively rapid inflow of air into the upper vacuum shaping mold that masks the effect of the relatively slow flow of air through the relatively small apertures in the apertured bottom wall 38 to cause the glass sheet to tilt as it drops toward the ring-like member 70.

The relative size of the total effective open area due to the positions of the apertures 63 relative to the side wall 39 compared to the total areea of the apertures in the apertured bottom wall 38 determines the effectiveness of the apertured slide 60 and apertures in apertured side wall 39 to overcome the tilting tendency. Other factors involved in determining the amount of effective open area of apertures 63 relative to the total area of the apertures of apertured wall 38 that are exposed when the apertured wall 38 engages a glass sheet that is required to insure a non-tilting transfer of the glass sheet from the upper vacuum shaping mold 36 to the ring-like member 70 include the area, thickness and irregularity of outline shape of the glass sheet pattern being treated.

Increasing the effective open area of aligned apertures 63 reduces the chances of tilting the disengaged glass sheet en route to the ring-like member 70 when the vacuum is released on the upper vacuum shaping mold 36 for any particular glass sheet pattern. However, if the effective open area is made too great, suction apparatus consuming a great amount of energy is required. In the interest of energy conservation, the effective open area of the aligned openings is made as small as possible consistent with the open area necessary to insure a glass sheet transfer without tilting.

The apertures in the apertured lower wall 38 are made as small as possible and are spaced as closely as is necessary to assure vacuum support for a hot glass sheet with reasonable energy consumption. For an upper vacuum mold having a glass sheet engaging apertures lower wall 38 with dimensions 46 inches (117 cm) long and 22 inches (56 cm) wide, apertures having a diameter of 0.09 inches (0.23 cm) and spaced apart from one another 1.5 inches (3.8 cm) in a rectangular or diamond pattern have been found to work adequately in handling glass sheets whose weight is up to 20 pounds (9 Kgm.). Five apertures, each having a diameter of one inch (25.4 mm) spaced apart on 2.2 inch (56 mm) centers are sufficient for the apertured slide 60 and the corresponding row of apertures in side wall 39.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with lower bar-type nozzle housings 54 disposed with thick walls extending vertically and having elongated openings 55 directed upward through their thickness so that air applied under pressure to the lower plenum 53 is directed through the elongated openings 55 upward against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving the ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenums 51 and 53 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzle housing 54 are smoothly surfaced and parallel to one another to provide discontinuous smooth surfaces on which glass cullet is deposited when a glass sheet fractures in the cooling station 14. The lower bar-type nozzle housings 54 are interconnected by a pivotally mounted frame 50 that pivots about an axis extending longitudinally of the length of the cooling station 14. Frame pivoting means 49 is provided to pivot the frame 50, thereby pivoting the smoothly surfaced lower bar-type nozzle housings 54 into an oblique orientation that permits the glass fragments to slide to one side of the cooling station to clear the cooling station of glass fragments rapidly and efficiently. The lower bar-type nozzle housings 54 are returned to their normal position after the fragments of a prior glass sheet have slid to one side of the cooling station and before the next glass sheet is processed. The means to pivot the lower bar-type nozzles 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shape glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on a frame 64. A lug 65 connected to frame 64 actuates limit switch LS-5. Elevator means 66 in the form of one or more pistons is rigidly supported (each with a piston rod 68) on said frame. Vertical guides 69 control movement of the frame 64 in such a manner that when piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor 20 comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced from one another along the length of the downstream conveyor 20 and the additional doughnut rolls 74 are rigidly supported with their common upper tangent occupying a horizontal plane slightly above the uppermost surface of ring-like member 70.

The ring-like member 70 comprises a rail that extends in the form of a ring-like structure disposed edgewise with its width forming the height of the rail. The rail comprises a transversely extending rail portion 76 at the upstream end of the ring-like member, a pair of longitudinally extending rail portions 77 that extend in a downstream direction from the transversely extending rail portion 76 and a pair of inturned downstream end rail portions 78. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. Both the ring-like member 70 and the reinforcing frame 80 have open portions at their downstream ends. The open portions are aligned with the doughnut rolls 56 for a reason to be explained.

A preferred embodiment of the ring-like member 70 shown in section in FIG. 10 comprises an inner metal rail 86 that extends in the form of a ring-like structure disposed edgewise with its width forming the height of the rail attached for reinforcement to a series of non-metallic bar portions 88 formed from cutting a board of non-metallic material such as an electric insulator material that is sold as SYNTHANE G-7 electric board by the Synthane Taylor Co. of Valley Forge Pennsylvania. Specifically, the connectors 79 are attached at their inner ends to the laterally outer surface of the inner metal rail 86 at spaced points therealong and at their outer ends to a reinforcing metal frame 80. Both the latter and the frame-like member 70 are open-ended at their downstream ends for reasons to be explained.

The insulator material for the non-metallic bar portions is composed of a series of fiber glass layers bonded together with an epoxy resin believed to be highly cured methyl phenyl silicone. The non-metallic bar portions 88 have a low heat conductivity and are of a low expansion material and are approximately 3 millimeters thick. Each of the non-metallic bar portions has a desired shape conforming to the shape of a different portion of the metal rail 86 except that the vertical heights of the non-metallic portions 88 are higher than the height of the inner metal rail 86. Each bar portion 88 is secured to the inner surface of the inner metal rail 86 by nut and bolt means spaced throughout the peripheral length of the inner metal rail 86 and extending through aligned bolt-receiving openings in the inner metal rail and the non-metallic bar portions 88. The bottom edges of the bar portions 88 are aligned with the bottom edge of the inner metal rail 86, although this is not absolutely necessary except that in such an arrangement the full height of the inner metal rail is provided in side-by-side relation to the non-metallic bar portions to reinforce the structural rigidity of the non-metallic bar portions with minimum heat capacity for the composite ring-like member 70.

The upper edge of each non-metallic bar portion 88 is disposed above the upper edge surface of the inner metal rail 86 and provides an upper edge surface of said ring-like member 70 so that when glass is deposited on the ring-like member, it makes contact only with the non-metallic glass engaging means provided by the bar portions 88 that are reinforced by the rigid metal rail in spaced relation below the line of glass sheet contact. The elevation of the glass supporting surface of the bar portions above the upper edge of the rigid reinforcing metal rail is preferably sufficient to provide a path of heat conduction through said non-metallic bar portions of sufficient length to have only minor detrimental effects in the cooling of the glass contacting portion. At the same time, the heat conduction path is not so long as to endanger the structural strength of the non-metallic bar portions 88.

A pair of upstream end stops 91 and 92 are attached to and located inwardly of the upstream end portion of frame 80 and outwardly or upstream of the ring-like member to. In addition, side stops 93 and 94 are attached to longitudinal side portions of the frame 80, and located transversely inwardly thereof. The side stops 93 and 94 are spaced from one another a distance slightly longer than the transverse dimension of the glass (about 5 millimeters more). The upstream end stops 91 and 92 are located a distance upstream from the upstream end portion of the ring-like member 70 in position to guide the location of the trailing edge of a glass sheet G so that the latter is oriented and aligned properly in the direction of the longitudinal dimension of the ring-like member 70 when the latter moves suddenly in the downstream direction toward the cooling station 14 with a shaped glass sheet dropped thereon. The side stops 93 and 94 insure that the glass sheet is aligned with the transverse dimension of the ring-like member 70 within permitted tolerance.

The reinforcing frame 80 is connected to a carriage 96 through connecting members 97. The carriage 96 is provided with upstanding ears 98 that terminate in internally threaded sleeves 100 that engage a worm drive 102 on each side of the carriage 96. This arrangement guides the movement of the ring-like member 70 between an upstream position at shaping station 16, a downstream position in alignment with sheet transfer means 17 and an intermediate parking position just downstream of the shaping station. The carriage 96 is reinforced by several arcuate cross braces (not shown) shaped to conform with the transverse curved shape defined by the upper surfaces of the lower bar-type nozzle housings 54 and the lower ends of the rows of upper pipe nozzles 52 so as to be capable of moving therebetween.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by ring-like member 70 and its supporting frame 80.

The worm drive 102 controls the position of the carriage 96 and is supported ring-like member 70 relative to one of the three positions of rest occupied by the ring-like member 70 during a cycle of operation. Limit switches LS-1, LS-2 and LS-3 are provided for actuation by a lug 104 attached to the carriage 96 to control different steps in a cycle of movement of the ring-like member 70 to be explained subsequently.

Cycle of Operation

At the beginning of a shaping cycle according to the present invention, a glass sheet G is conveyed into the glass shaping station 16 on conveyor rolls 18 with the lower mold 34 disposed in a retracted position and its upward facing curved shaping surface 22 entirely below the upper support surface provided by the conveyor rolls 18. At this time, as shown in FIG. 4, the upper vacuum mold 36 is located in a parking position wherein its apertured downward facing shaping surface 38 is spaced a short distance (approximately one glass sheet thickness) above the upper surface of the glass sheet G. The latter travels from a position between the sensing elements S for a sufficient time for it to be in the proper position of alignment between the lower lifting mold 34 and the upper vacuum mold 36. When the glass sheet is initially shaped to a cylindrical curve about an axis extending substantially parallel to the direction of glass sheet movement defined by the conveyor rolls 18, the exact moment that the lower lifting mold 34 is actuated is not as critical as it would be for more complicated bends.

As the glass sheet arrives at the shaping station 16, the piston 28 starts to extend, thereby permitting lug 33 to disengage from limit switch LS-4. This causes vacuum to be applied to the upper vacuum mold 36 simultaneously as the lower lifting mold 34 starts to rise. The glass sheet sags immediately, as shown in FIG. 5, while lifted on the lower lifting mold 34 into a position in the vicinity of the upper vacuum mold 36.

Since the glass sheet is hot when it arrives at the shaping station, it readily sags by gravity to conform to the relatively sharp curvature of the upwardly facing shaping surface of the lower mold 34 by the time it arrives in position in close adjacency to the downward facing shaping surface of the upper vacuum mold 36 where suction causes the glass sheet to jump into engagement with the downward facing surface of the upper vacuum mold 36. Glass sheet G is lifted into close adjacency to the upper vacuum mold 36 by limiting the extent of upward movement of piston 28, and before the glass sheet is simultaneously engaged between the upward facing surface of the lower lifting mold 34 and the downward facing shaping surface of the upper vacuum mold 36, suction lifts the shaped glass sheet G away from the lower lifting mold 34 so that a pair of opposite edge portions only of the glass is initially into engagement with the downward facing shaping surface of the upper vacuum mold 36.

The shape defined by the downward facing shaping surface of the upper vacuum mold 36 is preferably of a shallower bend than the upward facing shaping surface of the lower lifting mold 34. This arrangement permits the glass sheet G to be initially supported against the downward facing shaping surface of the upper vacuum mold 36 in the position depicted in FIG. 6 with the portion of the glass sheet intermediate its engaged, opposite edge portions initially out of contact with the downward facing shaping surface of the upper vacuum mold 36. FIG. 6 shows the positions of the glass sheet when it has been lifted by suction against the upper vacuum mold 36 at the moment that the lower lifting mold 34 starts its downward return.

The lower lifting mold 34 has been lifted in response to the sensor S actuating a timer circuit (not shown) that extends the piston 28 on sensing the passage of the glass sheet G into the shaping station 16. Limit switch LS-4 is released by the onset of lifting of the lifting mold 34 to simultaneously actuate the vacuum for the upper vacuum mold 36 as previously described, and also actuates a timer that controls the onset of the return of the lower lifting mold 34 to its recessed position.

Figure 7:
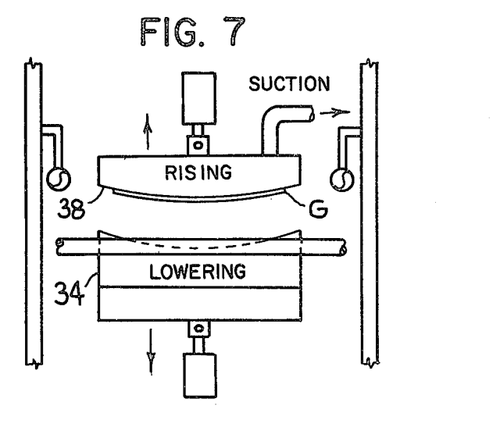
FIG. 7 is a view taken shortly after that of FIG. 6, showing how continued suction increases the area of engagement between the glass sheet and the upper vacuum mold as the lower, lifting mold starts to move downward and the upper vacuum mold rises to lift the glass sheet toward a raised position that provides clearance for the entry of a ring-like member below the upper vacuum mold.

The latter time is timed to insure that the beginning of the downward return of the lower lifting mold 34 by retracting piston 28 is coordinated with the time that the glass sheet is engaged by suction against the downward facing shaping surface of the upper vacuum mold 36. The timer also initiates the upward retraction of vertical piston 43 which causes lifting of the upper vacuum mold 36 simultaneously with the downward movement of the lower lifting mold 34. Vacuum is continued as the upper vacuum mold rises so as to cause the upper surface of the glass sheet to conform exactly to the more shallow shape of the downward facing shaping surface of the upper vacuum mold 36. This stage of the operation is depicted in FIG. 7.

Figure 8:
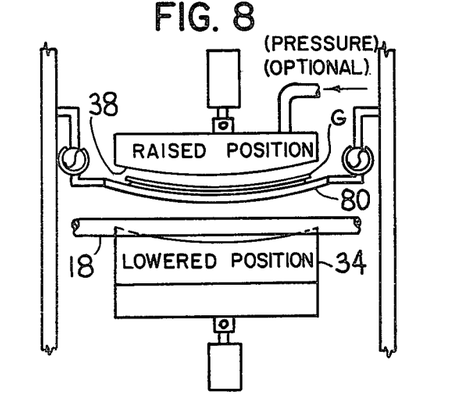
FIG. 8 is a view taken shortly after FIG. 7, showing the lower lifting mold and upper vacuum mold separated and a ring-like member whose upper surface defines a transverse shape having the radius of curvature of the upper vacuum mold receiving the glass sheet from the upper vacuum mold.

When the upper vacuum mold 36 reaches the raised position shown in FIG. 8 and the lower mold 34 has been lowered sufficiently, the shaping station is now ready to receive the ring-like member 70 into position between the upper vacuum mold 36 and the lower lifting mold 34. When lug 104 on carriage 96 engages limit switch LS-1, the ring-like member 70 is stopped at its aforesaid upstream position directly below the upper vacuum mold 36 with its upstream end stops 91 and 92 slightly upstream of the trailing edge of the glass sheet. At the same time, when the ring-like member 70 occupies its upstream position immediately below the upper vacuum mold 36, limit switch LS-1 releases the vacuum in upper vacuum mold 36, thereby permitting the shaped glass sheet to be deposited onto the ring-like member 70. The shape of the ring-like member transverse to the path of movement, and particularly the transversely extending portion 76 of the ring-like member 70 may have the same curvature or a different curvature from that defined by the downwardly facing shaping surface of the upper vacuum mold 36.

Optionally, the upper vacuum mold 36 may be pressurized when the vacuum is released to apply fluid under pressure through its apertured, downwardly facing shaping surface. Under these circumstances, the glass sheet, still soft from its heating in the furnace 12, is drop formed to a shape that corresponds to the outline shaping surface defined by the ring-like member 70.

The member 70 starts to move suddenly into the cooling station 14 with the glass sheet supported thereon in slight longitudinal misalignment. The sudden start causes the glass sheet to slide backward until its trailing edge engages the upstream end stops to insure proper alignment and orientation of the glass sheet on the ring-like member 70.

Figure 9:
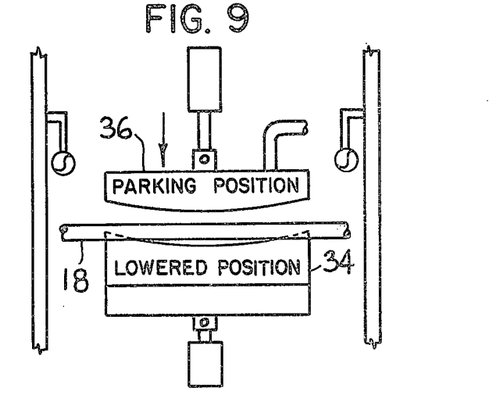
FIG. 9 is a view of the shaping station taken shortly after FIG. 8, showing how the upper vacuum mold returns to its parking position and the lower lifting mold remains in its lowered position of FIG. 8 after the ring-like member has removed the shaped glass sheet from the shaping station.

When the ring-like member 70 reaches the cooling station 14, the lug 104 engages limit switch LS-3. This engagement actuates piston 43 to lower the upper vacuum mold 36 to its parking position no more than three glass sheet thicknesses above the path defined by conveyor rolls 18, yet sufficiently above said conveyor rolls to permit the next heat-softened glass sheet to arrive at the shaping station 14 thereneath. FIG. 9 shows the relative positions of the upper vacuum mold 36 and the lower mold 34 relative to the conveyor rolls 18 while awaiting the arrival of the next glass sheet to be shaped.

The glass sheet G supported on the ring-like member 70 is transferred to the cooling station 14 where air under pressure is applied through the downward facing nozzles 52 extending from the upper plenum chamber 51 and through the orifices of the lower bar-type nozzles 54 extending upward from the lower plenum chamber 53 to cool the glass as rapidly as possible to impart at least a partial temper thereto. When the glass sheet reaches a position above the doughnut rolls 56, the latter are raised in unison to lift the glass sheet G off the ring-like member 70 while rotating in unison in a direction that propels the glass sheet in a downstream direction onto the downstream conveyor 20.

FIG. 3 shows the cooled glass sheet G transferring from the doughnut rolls 56 of the sheet transfer means 17 in a downstream direction depicted by the arrow d while the ring-like member 70 is simultaneously beginning to return in an upstream direction depicted by the arrow u toward the intermediate parking position immediately downstream of the shaping station 16 in case the succeeding glass sheet G has not as yet been engaged by suction by the upper vacuum shaping mold 36. The ring-like member 70 may move into a parking position immediately downstream of the shaping station 16 or directly into its upstream position at the shaping station 16 should the next glass sheet be already supported by suction against the upper vacuum mold 36 and the lower lifting mold 34 has moved down to a vertical position sufficiently low to provide clearance for the ring-like member 70 to move to below the vacuum mold 36 without stopping.

When the glass sheet supported on the ring-like member 70 arrives in a position above the sheet transfer means 17, the doughnut rolls 56 and their thin shafts 58 are in their downward retracted position with frame 64 being retracted downwardly by the retraction of piston rod 68 actuated by elevator means 66 while awaiting the arrival of the ring-like member 70 into position where lug 104 engages limit switch LS-2. The worm drive 102 has driven the carriage 96 and its supported ring-like member 70 part way into the sheet transfer means 17. A timer circuit actuated by lug 104 engaging limit switch LS-2 in the downward direction has caused the elevator means 66 to raise the piston 68, thereby lifting frame 64, shafts 58 and rotating doughnut rolls 56 into intermediate positions approaching the level at which they would lift the glass sheet G off the ring-like member. This upward movement releases limit switch LS-5, thereby causing the doughnut rolls 56 to start to rotate in unison.

When the ring-like member 70 arrives at its most downstream position, lug 104 engages limit switch LS-3 to stop the worm drive 102. At this time, the rotating doughnut rolls 56 have begun to transfer the glass sheet over the ring-like member 70 toward the most upstream doughnut roll 74 of the downstream conveyor 20. The piston rod 68 remains fully extended as the glass sheet G continues to move downstream further into the downstream conveyor 20. At a proper time, a timer actuated by limit switch LS-3 controls the onset of the reverse rotation of the worm drive 102 that controls the return movement of the ring-like member 70 in an upstream direction to either its parking position or directly into the shaping station. An additional timer controlled by limit switch LS-3 causes the elevator means 66 to start to retract the piston rods 68, thereby lowering the doughnut rolls 56 and their thin shafts 58 to prepare the transfer means 17 for the next operation.

The upper vacuum mold 36 is provided with the safety limit switch LS-6, for engagement when the upper vacuum mold 36 is in an elevated position sufficient to permit clearance for the ring-like member 70 to enter the glass shaping station 16. Unless safety switch LS-6 is so engaged, the ring-like member 70 is prevented from continuing its return movement in an upstream direction beyond its parking station. Such a safety feature prevents a collision between the ring-like member 70 and the upper vacuum mold 36 when the vacuum mold 36 is in its parking position to receive a heat-softened glass sheet by suction or is moving upwardly toward its raised position while engaging said heat-softened glass sheet.

If the apparatus operates rapidly enough, as indicated by the time out of a timer circuit whose time starts by a subsequent actuation of the sensing means S that brings the next glass sheet into the shaping station 16 for lifting by the lifting mold 34, suction and lifting by the vacuum mold 36, and engagement of the upper vacuum mold in its raised position with limit switch LS-6, the reset limit switch LS-4 and the engaged limit switch LS-6 permit the ring-like member 70 to move directly upstream through its parking position into the shaping station 16 without stopping at its parking position.

During the time that the ring-like member 70 moves into or through the parking position controlled by the engagement of lug 104 against limit switch LS-2, lower lifting mold 34 remains retracted in its lowered position below the conveyor rolls 18 and upper vacuum mold 36 remains in its raised position. The molds in the aforsaid respective positions provide clearance for the returning ring-like member 70 to enter into a position of alignment between the upper vacuum mold 36 and the lower lifting mold 34.

The shaping rail of the ring-like member 70 may be provided with longitudinally extending rail portions 77 that are curved either concavely or convexly in elevation or curved both ways in combination with the transverse rail portion 76 that is curved in elevation to define compound shaping surfaces. If the longitudinally extending portions 77 of the rail have an upper shaping surface that is straight, then the ring-like member defines a cylindrical curvature whose radius of curvature defined by the transversely extending rail portion 76 may be the same as or different from that defined by the downward facing shaping surface of the upper vacuum mold 36. It is also understood that the transversely extending rail portion 76 may define a shaping surface portion whose shape is any shape desired other than cylindrical.

According to a specific embodiment, a combination of a lower lifting mold having an upward facing shaping surface of a relatively sharp bend, such as a 48 inch radius of curvature, has been combined with an upper vacuum mold having a downward facing shaping surface defining a cylindrical bend of 50 inch radius of curvature to provide cylindrical bends in a glass sheet by a combination of lifting and suction forming. Glass sheets so bent to a cylindrical radius of curvature of 50 inches have had their shapes modified by drop forming the bent sheets onto readily replaceable ring-like members defining radii of curvature from less than 43 inches to greater than 60 inches. In addition, cylindrical bends formed by suction against the upper shaping surface have been converted into compound curvatures by drop forming the hot glass sheet from the upper vacuum mold onto ring-like members whose longitudinal shaping rail portions are shaped to conform to the shape desired for the other component of bending about an axis extending transverse to the path of movement. The drop forming can simultaneously develop a cylindrical or other curved component formed about an axis of bending longitudinal to the path of movement.

It is understood that any type of complicated bend defined by the rail-like member including complicated bends having both convex and concave elements in elevation in the direction of glass sheet movement may be combined with any transverse radius of curvature within a wide range of limits.

According to a preferred embodiment, therefore, a permanently installed lower mold 34 having an upward facing shaping surface of cylindrical configuration cooperates with a permanently installed upper vacuum mold having a downward facing shaping surface of a larger radius of curvature of cylindrical configuration in combination to form a bend having a shape conforming to that of the downward facing shaping surface of the upper vacuum mold. However, if further shaping is desired, then the shape of the ring-like member defines a different shape correlated with the ultimate shape desired for the glass sheet. Therefore, the present apparatus does not require any replacement of either the lower mold or the upper vacuum mold. It is only necessary to change the ring-like member whenever a change in production pattern calling for shaping a glass sheet to a different outline or a different configuration which could be either a cylindrical bend or a more complicated bend incorporating a cylindrical bend having a radius of curvature over a relatively wide range of curvatures or a non-cylindrical bend component is required.

Thin glass sheets are heated to a temperature in the range of 1220° F. (660° C.) to 1230° F. (666° C.) for $\frac{1}{8}$ inch (3.2 mm) thickness when they leave the furnace 12. Such an elevated temperature range is needed for the thin glass sheet to sag by gravity as the lifting mold 34 lifts the glass sheet toward the closely adjacent upper vacuum mold 36 to a position where the suction applied through the apertured, downwardly facing shaping surface of the vacuum mold 36 is strong enough to cause the heat-softened, sagged glass sheet to jump upward into engagement with the upper vacuum mold 36.

The present invention reduces the time needed for a complete bending and cooling cycle by lowering the upper vacuum mold into its parking position in close adjacency to the path of glass movement defined by the conveyor rolls 18 as soon as possible after the ring-like member 70 with a shaped glass sheet supported thereon has cleared the shaping station 16 while moving in a downstream direction to transport the shaped glass sheet into the cooling station 14. In addition, the lower lifting mold 34 in its lowered position has the uppermost portion of its upwardly facing shaping surface immediately below the path defined by the upper tangent common to the conveyor rolls 18. The present invention thus reduces the time needed to lift each glass sheet in turn into engagement with the upper vacuum mold because the parking position for the upper vacuum mold 36 is only a short distance above the lowered position of the lower lifting mold 34 according to the teaching of this invention.

The form of the invention shown and described in this disclosure represents an illustrative preferred embodiment and various modifications thereof. it is understood that various changes may be made in the structure and method of operation such as may be dictated by handling different glass sheet sizes and thicknesses without departing from the gist of the invention except insofar as defined in the claimed subject matter that follows.

I claim:

1. In the art of shaping glass sheets wherein a heat-softened glass sheet is delivered into a shaping station along a given path of travel, is lifted from said path of travel toward a downwardly facing shaping surface of a vacuum mold and transferred by suction onto said vacuum mold, the improvement comprising maintaining said vacuum mold in a parking position at an elevation not exceeding three thicknesses of said glass sheet above said given path, yet sufficiently high to permit said glass sheet to be delivered to a position beneath said vacuum mold along said given path of travel; lifting said heat-softened glass sheet toward said vacuum mold on a lifting mold having an upwardly facing shaping surface when said glass sheet arrives at said shaping station; simultaneously applying suction to said vacuum mold while starting to lift said lifting mold toward said vacuum mold until said lifted glass sheet is supported against and shaped to conform to said downwardly facing shaping surface; lowering said lifting mold from said vacuum mold when said glass sheet is transferred to said vacuum mold and lifting said vacuum mold a sufficient distance to allow entry of a ring-like member into said shaping station beneath said vacuum mold and above said given path.

2. The method as in claim 1, further including inserting said ring-like member into position below said lifted vacuum mold and above said given path and releasing vacuum from said vacuum mold to drop said shaped glass sheet from said vacuum mold to said ring-like member.

3. The method as in claim 2, further including forcing pressurized fluid through the downwardly facing shaping surface of said vacuum mold to force said shaped glass sheet to drop from said vacuum mold to said ring-like member when said vacuum is released.

4. The method as in claim 3, wherein said pressurized fluid is air.

5. The method as in claim 2 or claim 3 or claim 4, further including moving said shaped glass sheet from said shaping station to a cooling station while said glass sheet is supported on said ring-like member and applying relatively cool tempering medium against the major surfaces of said glass sheet at a rate sufficient to impart at least a partial temper in said glass sheet.

6. The method as in claim 5, characterized by supporting said shaped glass sheet on said ring-like member provided with an open downstream end portion providing clearance for lifting means that lift said shaped and cooled glass sheet from said ring-like member, further including lifting said shaped and cooled glass sheet from said ring-like member on said lifting means at a transfer station and returning said ring-like member from said transfer station in an upstream direction to said shaping station while said lifting glass sheet moves in a downstream direction from said transfer station.

7. The method as in claim 6, further including supporting said lifting mold with its upwardly facing shaping surface disposed immediately below said given path of travel between successive glass sheet lifting steps to reduce the lifting distance needed to raise said glass sheet into a position wherein suction from said vacuum mold at its parking position causes said glass sheet to jump from a position of support by said lifting mold to a position of engagement with said vacuum mold.

8. The method as in claim 7, wherein said glass sheet is heated to an elevated temperature in the range of 1220° F. (660° C.) to 1230° F. (666° C.) just prior to said delivery to said shaping station.

9. Apparatus for shaping a glass sheet comprising a conveyor defining a given path of travel, a furnace for heating said glass sheet to its deformation temperature, a shaping station located downstream of said furnace, said conveyor extending through said furnace and into said shaping station and a cooling station located immediately downstream of said shaping station;

said shaping station comprising a lower lifting mold having an upwardly facing shaping surface, means for moving said lifting mold between a lowered position wherein said upwardly facing shaping surface is located immediately beneath said given path of travel and a lifted position wherein said upwardly facing shaping surface is located immediately above said given path of travel, an upper vacuum mold having a downwardly facing shaping surface that is apertured for drawing suction through the apertures of said shaping surface, and means for moving said upper vacuum mold between a parking position wherein its downwardly facing shaping surface is spaced above said given path of travel by a minimum distance greater than the thickness of said glass sheet and a maximum distance greater than the thickness of said glass sheet and a maximum distance sufficiently closely above said upwardly facing shaping surface of said lifting mold when said lifting mold occupies its lifted position to enable suction drawn through said apertures to lift said glass sheet by suction from said lifting mold and a raised position;

means to control the application of suction through said apertures from the time that said lifting mold starts to move upwardly from its lowered position until after said upper vacuum mold moves upwardly to said raised position;

a ring-like member and means to move said ring-like member from said cooling station in an upstream direction into said shaping station beneath said upper vacuum mold when said vacuum mold occupies its raised position, said raised position being sufficiently above said given path to provide clearance for said ring-like member between said upper vacuum mold and said given path;

means to control said movement of said ring-like member in an upstream direction into said cooling station until said upper vacuum mold has moved upward into said raised position and said lower, lifting mold is not above said given path;

means to control the application of said suction through said downwardly facing shaping surface of said upper vacuum mold until such time as said ring-like member is below said upper vacuum mold; and means synchronized with the stopping of said suction application to move said ring-like member in a downstream direction into said cooling station and to lower said lifting mold to its lowered position, and, when said ring-like member clears said shaping station, to lower said upper vacuum mold to its parking position to await the arrival of a succeeding glass sheet from said furnace.

10. Apparatus as in claim 9, further including means to apply fluid under pressure through said downwardly facing shaping surface when said suction is no longer applied.

11. Apparatus as in claim 10, wherein said ring-like member is provided with a pair of upstream end stops spaced upstream of the upstream end of said ring-like member and said means to control the movement of said ring-like member in an upstream direction is construed and arranged to stop said ring-like member at an upstream position such that said glass sheet drops onto said ring-like member on the stopping of said suction application through said downwardly facing shaping surface with the trailing edge of said glass sheet spaced a short distance downstream of said pair of upstream end stops, whereby when said ring-like member suddenly starts to move in a downstream direction said glass sheet slides relative to the upper surface of said ring-like member to engage its trailing edge against said pair of upstream end stops.

12. Apparatus as in claim 11, further including glass sheet transfer means in the downstream portion of said cooling station, said glass sheet transfer means comprising a plurality of vertically movable, rotatable rolls and said ring-like member being provided with a pair of inturned downstream end portions whose inner ends are transversely spaced from one another to provide clearance for moving the downstream portion of said ring-like member through the position occupied by said rotatable rolls, means responsive to the arrival of said ring-like member at said transfer means to rotate and move said rotatable rolls vertically from a position below said ring-like member to a position above said ring-like member to remove said glass sheet in a downstream direction from said sheet transfer means and to continue to move said glass sheet in said downstream direction when the direction of movement of said ring like member is reversed into said upstream direction before said glass sheet clears said ring-like member completely.

13. A method of shaping a glass sheet comprising the steps of:

positioning shaping surface of a vacuum shaping mold above and spaced from a generally horizontal path of travel, the shaping surface spaced from the path of travel a distance sufficient to move a sheet under the shaping surface and sufficient to draw by vacuum a sheet having portions shaped similar to corresponding portions of the shaping surface upwardly against the shaping surface of the shaping mold;

moving a heat-softened glass sheet along the path of travel beneath the shaping surface of the vacuum mold;

lifting a lower mold having a shaping surface having portions similar to the shaping surface of the vacuum shaping mold upwardly to lift and shape the sheet while maintaining the sheet spaced from the shaping surface of the vacuum shaping mold;

applying vacuum through the shaping surface of the vacuum shaping mold to move the spaced shaped sheet upwardly off the shaping surface of the lower mold against the shaping surface of the vacuum shaping mold to shape the sheet to conform to the shaping surface of the vacuum mold.

14. The method as set forth in claim 13 further including the step of:
moving pressurized fluid through the downwardly facing shaping surface of the vacuum shaping mold to bias the shaped sheet toward the lower mold.

15. The method as set forth in claim 13 or 14 further including the steps of:
moving the shaped glass sheet downstream along the path of travel into a cooling station; and
applying relatively cool tempering medium against major surfaces of the glass sheet at a rate sufficient to impart at least a partial temper in the glass sheet.

16. An apparatus for shaping a glass sheet comprising:
a vacuum shaping mold having a shaping surface;
conveying means to move a sheet along a generally horizontal path of travel;
means for mounting said vacuum mold above said conveying means with its shaping surface spaced from said conveying means a distance sufficient to position a sheet to be shaped beneath the shaping surface of said vacuum mold and sufficient to draw by vacuum a sheet having portions shaped similar to corresponding portions of the shaping surface of said vacuum mold upwardly against the shaping surface of said vacuum shaping mold;
a lifting mold having a shaping surface having portions shaped similar to corresponding portions of said vacuum mold;
means for mounting said mold beneath said conveying means and spaced from said vacuum shaping mold; and
means for limiting upward movement of the lifting mold to a position where the vacuum mold by vacuum will draw the sheet upward.

17. The apparatus as set forth in claim 16 further including:
means for moving a fluid under pressure through the shaping surface of said vacuum shaping mold to bias the shaped sheet toward said lifting mold.

18. The apparatus as set forth in claim 16 wherein said conveying means includes a ring-like member and means for moving said ring-like member along the path in response to the movement of at least said lifting mold.

19. The apparatus as set forth in claim 18 futher including:
a cooling station downstream of said vacuum mold; and
said moving means of said conveying means moves said ring-like member downstream into said cooling station and upstream beneath said vacuum shaping mold.

* * * * *